US012567925B2

(12) United States Patent
Xiong et al.

(10) Patent No.: US 12,567,925 B2
(45) Date of Patent: Mar. 3, 2026

(54) METHOD AND DEVICE FOR ENHANCING UPLINK SIGNAL TRANSMISSION

(71) Applicant: Samsung Electronics Co., Ltd., Suwon-si (KR)

(72) Inventors: Qi Xiong, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 527 days.

(21) Appl. No.: 18/150,715

(22) Filed: Jan. 5, 2023

(65) Prior Publication Data

US 2023/0224073 A1    Jul. 13, 2023

(30) Foreign Application Priority Data

Jan. 7, 2022    (CN) .......................... 202210015603.3

(51) Int. Cl.
  *H04L 1/00*       (2006.01)
  *H04B 17/318*     (2015.01)
  *H04W 24/10*      (2009.01)

(52) U.S. Cl.
  CPC ......... *H04L 1/0025* (2013.01); *H04B 17/318* (2015.01); *H04W 24/10* (2013.01)

(58) Field of Classification Search
  CPC ... H04L 1/0025; H04L 1/0001; H04L 1/0015; H04L 1/0026; H04L 5/0053; H04L 27/2642; H04L 27/2636; H04L 1/1812; H04B 17/318; H04B 17/328; H04W 24/10; H04W 24/02; H04W 74/0836
  See application file for complete search history.

(56) References Cited

U.S. PATENT DOCUMENTS

| | | | |
|---|---|---|---|
| 2013/0332177 A1 | 12/2013 | Helmrich et al. | |
| 2018/0049177 A1 | 2/2018 | Islam et al. | |
| 2018/0124710 A1 | 5/2018 | Ly et al. | |
| 2018/0139785 A1 | 5/2018 | Zhang et al. | |

(Continued)

FOREIGN PATENT DOCUMENTS

| | | | | |
|---|---|---|---|---|
| CN | 111512665 A | * | 8/2020 | ............ H04W 72/23 |
| EP | 3499742 A1 | * | 6/2019 | ............ H04W 72/23 |

(Continued)

OTHER PUBLICATIONS

Matlab, NR PUSCH Resource Allocation and DM-RS and PT-RS Reference Signals (Year: 2025).*

(Continued)

*Primary Examiner* — Charles C Jiang
*Assistant Examiner* — Rachel Elizabeth Marks

(57)    ABSTRACT

The present disclosure provides a method and device for enhancing uplink signal transmission. UE can acquire indication information for a plurality of different transmission modes through the method provided by the present disclosure, and can also determine the transmission mode to be used according to the criteria for determining to use the different transmission modes provided by the present disclosure. Moreover, according to the method of the present disclosure, the UE can determine an opportunity to use the changed transmission mode. Thus, the UE can use an appropriate transmission mode in the case of different requirements (for example, different coverage requirements).

20 Claims, 8 Drawing Sheets

(56) References Cited

U.S. PATENT DOCUMENTS

| | | | |
|---|---|---|---|
| 2020/0145070 A1 | 5/2020 | Raghavan et al. | |
| 2020/0214044 A1* | 7/2020 | Qian ................... | H04W 52/325 |
| 2021/0281455 A1 | 9/2021 | Lee et al. | |

FOREIGN PATENT DOCUMENTS

| | | | | |
|---|---|---|---|---|
| EP | 3603231 B1 | 9/2021 | | |
| EP | 3890225 A1 | 10/2021 | | |
| JP | 2006287438 A | 10/2006 | | |
| WO | 2019120476 A1 | 6/2019 | | |
| WO | WO-2019199858 A1 * | 10/2019 | .......... | H04B 17/309 |
| WO | 2020124611 A1 | 6/2020 | | |
| WO | WO-2021047973 A1 * | 3/2021 | ............ | H04W 72/23 |

OTHER PUBLICATIONS

Machine translated to English version of CN 111512665 A retrieved from PE2E on Jun. 13, 2025 (Year: 2020).*

International Search Report and Written Opinion of the International Searching Authority dated Apr. 7, 2023, in connection with International Application No. PCT/KR2023/000223, 9 pages.

The Partial Supplementary European Search Report dated Feb. 20, 2025, in connection with European Patent Application No. 23737402.0, 16 pages.

Extended European Search Report dated May 26, 2025, in connection with European Application No. 23737402.0, 23 pages.

* cited by examiner

METHOD AND DEVICE FOR ENHANCING UPLINK SIGNAL TRANSMISSION

CROSS-REFERENCE TO RELATED APPLICATIONS

This application is based on and claims priority under 35 U.S.C. § 119(a) of a Chinese patent application number 202210015603.3, filed on Jan. 7, 2022, in the Chinese National Intellectual Property Administration, the disclosure of which is incorporated by reference herein in its entirety.

BACKGROUND

1. Field

The present application generally relates to the field of communication.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

In one aspect of the present application, there is provided a method performed by user equipment (UE), which may comprise: determining a waveform mode for uplink signal transmission; and transmitting an uplink signal using the determined waveform mode.

In one embodiment, determining a waveform mode for uplink signal transmission may comprise: determining the waveform mode according to a measurement result of a downlink (DL) signal; and/or determining the waveform mode according to a waveform mode indication and/or a waveform mode change indication received from a base station.

In one embodiment, determining the waveform mode according to a measurement result of a DL signal may comprise: comparing a reference signal received power (RSRP) of the DL signal with a first threshold value and determining the waveform mode according to the comparison result.

In one embodiment, the RSRP may comprise at least one of: a single measurement of the DL signal, an average or maximum of multiple measurements over a period of time, and a change of the RSRP.

In one embodiment, the first threshold value may comprise at least one of: a configured threshold value and a reused threshold value.

In one embodiment, comparing an RSRP of the DL signal with a first threshold value and determining the waveform mode according to the comparison result may comprise: determining the waveform mode when a first condition is satisfied, wherein the first condition may comprise a combination of one or more of: the measured RSRP is less than or equal to the first threshold value; the measured RSRP is greater than or equal to the first threshold value; the measured change of the RSRP is less than or equal to the first threshold value; and the measured change of the RSRP is greater than or equal to the first threshold value; wherein determining the waveform mode when a first condition is satisfied may comprise a combination of one or more of: determining to use a second waveform mode when the measured RSRP is less than or equal to the first threshold value; determining to use a first waveform mode when the measured RSRP is greater than or equal to the first threshold value; determining not to change the previously or currently used waveform mode when the measured change of the RSRP is less than or equal to the first threshold value; determining to continue using the first waveform mode when the measured change of the RSRP is a positive change which has an amount greater than or equal to the first threshold value and the waveform mode previously or currently used by the UE is the first waveform mode; determining to change to the first waveform mode when the measured change of the RSRP is a positive change which has an amount greater than or equal to the first threshold value and the waveform mode previously or currently used by the UE is the second waveform mode; determining to change to the second waveform mode when the measured change of the RSRP is a negative change which has an amount greater than or equal to the first threshold value and the waveform mode previously or currently used by the UE is the first waveform mode; and determining to continue using the second waveform mode when the measured change of the RSRP is a negative change which has an amount greater than or equal to the first threshold value and the waveform mode previously or currently used by the UE is the second waveform mode.

In one embodiment, satisfying the first condition may comprise satisfying the first condition once, satisfying the first condition up to or over a certain number of times, or consecutively satisfying the first condition up to or over a certain number of times.

In one embodiment, the waveform mode indication and/or the waveform mode change indication is received from the base station when a second condition is satisfied, wherein the second condition may comprise a combination of one or more of: the UE reports the value or change of the RSRP of the DL signal; the UE transmits a sounding reference signal (SRS); the UE transmits a waveform mode confirmation request and/or a waveform mode change request; and the waveform mode determined by the base station is different from the waveform mode previously or currently used by the UE.

In one embodiment, the method may further comprise applying the determined waveform mode, which may comprise: determining the time for applying the determined waveform mode according to the time when the waveform mode indication and/or the waveform mode change indication is received from the base station.

In one embodiment, determining the time for applying the determined waveform mode according to the time when the waveform mode indication and/or the waveform mode change indication is received from the base station may comprise: determining a first time for applying the determined waveform mode according to a time unit and a first time interval when an acknowledgement of the waveform mode confirmation request and/or the waveform mode change request is received from the base station; and/or determining a second time for applying the determined waveform mode according to a time unit and a second time interval when the waveform mode indication and/or the waveform mode change indication is received from the base station.

In one embodiment, a second operation is performed when the waveform mode is determined and a third condition is satisfied, wherein the third condition may comprise a combination of one or more of: the UE performs four-step random access; the UE performs two-step random access; the UE performs packet data transmission; in a hybrid automatic repeat request (HARD) process; in transmission of a transport block over multiple slots (TBoMS); in a time domain window to which joint channel estimation and/or demodulation reference signal (DMRS) bundle is applied; when an inter-slot or intra-slot frequency hopping operation is activated in transmission of a physical uplink shared channel (PUSCH); and when transmission of a phase tracking reference signal is performed; wherein the second operation may be a combination of one or more of: applying the determined waveform mode after the delay time; not applying the determined waveform mode; ignoring the waveform mode indication and/or the waveform mode change indication from the base station; stopping the current signal transmission; and resuming signal transmission using the determined waveform mode.

In one embodiment, the waveform mode may comprise at least one of the first waveform mode indicated as transform precoding disabled and the second waveform mode indicated as transform precoding enabled.

In one embodiment, after determining the waveform mode according to the measurement result of the DL signal, the method may further comprise: applying the determined waveform mode directly; and carrying an indication of the applied waveform mode in the uplink signal.

In one embodiment, the indication of the applied waveform mode may comprise at least one of: an uplink control information (UCI) part and a transmission configuration on the physical uplink shared channel (PUSCH).

In one embodiment, the DL signal may comprise N DL signals, the N DL signals may be configured by the base station or determined by the UE, and N may be a positive integer greater than or equal to 1.

In one embodiment, the N DL signals may be the first N DL signals with the highest strength determined by the UE.

In another aspect of the present application, there is provided a method performed by a base station, which may comprise: when a second condition is satisfied, transmitting to user equipment (UE) a waveform mode indication and/or a waveform mode change indication for uplink signal transmission, wherein the second condition may comprise a combination of one or more of: the measured value or change of a reference signal received power (RSRP) of a downlink (DL) signal is received from the UE; a sounding reference signal (SRS) is received from the UE; a waveform mode confirmation request and/or a waveform mode change request is received from the UE; and the waveform mode determined by the base station is different from the waveform mode previously or currently used by the UE.

In one embodiment, the waveform mode may comprise at least one of a first waveform mode indicated as transform precoding disabled and a second waveform mode indicated as transform precoding enabled.

In a further aspect of the present application, there is provided user equipment (UE), which may comprise: a memory for storing computer-executable instructions; and a controller, being configured to execute the computer-executable instructions to implement the method performed by the UE as previously described.

In yet another aspect of the present application, there is provided a base station, which may comprise: a memory for storing computer-executable instructions; and a controller, being configured to execute the computer-executable instructions to implement the method performed by the base station as previously described.

In still another aspect of the present application, there is provided a non-transitory computer-readable medium, which has computer-executable instructions stored thereon. When executed by a processor, the instructions cause the processor to perform the method of the UE or the base station as previously described.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
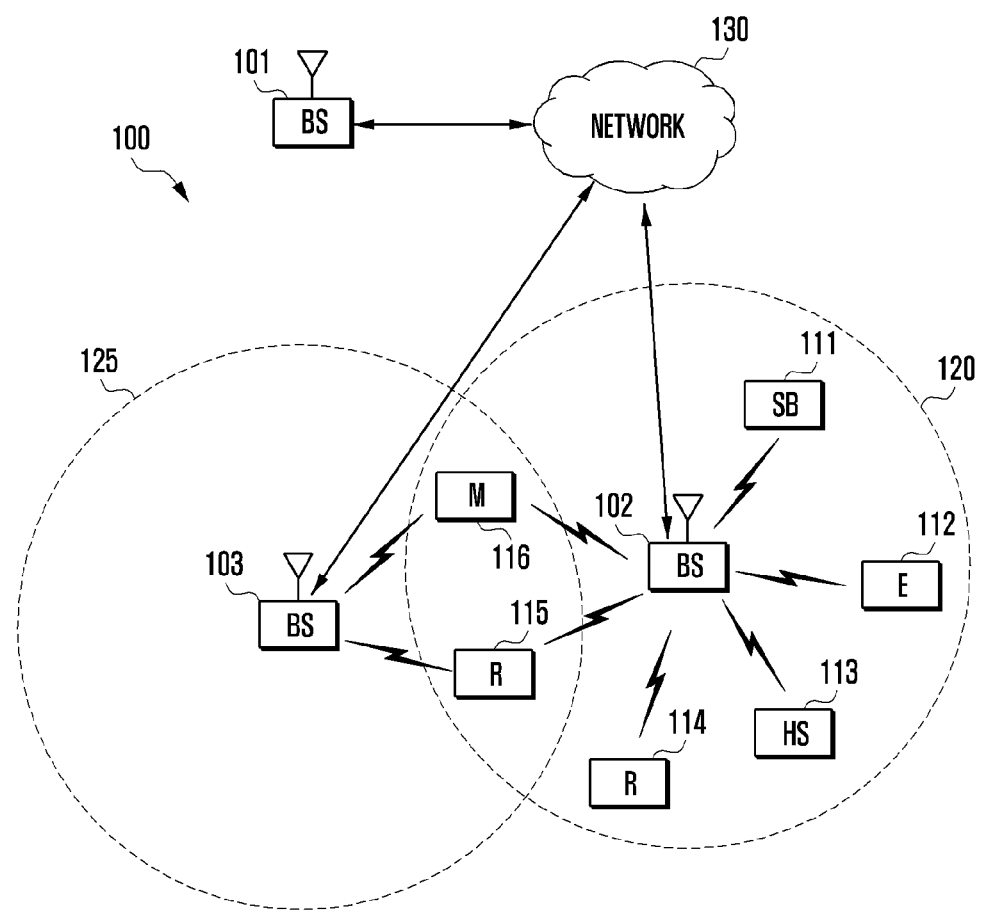
FIG. 1 illustrates an example wireless network 100 according to various embodiments of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Exemplary embodiments of the present disclosure will be further described below in conjunction with the attached drawings.

As can be understood by those skilled in the art, the singular forms "a," "an" and "the" used herein may also include the plural forms, unless specially stated otherwise. It shall be further understood that the expression "comprise" used in this specification of this application refers to the presence of stated features, integers, steps, operations, elements, and/or components, but does not preclude the presence or addition of one or more other features, integers, steps, operations, elements, components, and/or groups thereof. It shall be understood that when an element is referred to as being "connected" or "coupled" to another element, it may be directly connected or coupled to the other element or there may also exist an intervening element. Furthermore, "connected" or "coupled" as used herein may comprise wirelessly connected or wirelessly coupled. The expression "and/or" used herein includes all or any unit and all combinations of one or more associated list items.

As can be understood by those skilled in the art, unless otherwise defined, all terms (including technical and scientific terms) used herein have the same meaning as those commonly understood by those of ordinary skill in the art to which this application belongs. It shall be further understood that terms, such as those defined in general dictionaries, should be interpreted as having a meaning consistent with their meaning in the context of the prior art and will not be interpreted in an idealized or overly formal sense unless specially so defined herein.

As can be understood by those skilled in the art, the terms "terminal" and "terminal device" used herein include both a wireless signal receiver device (which has only a wireless signal receiver device without transmitting capability) and a receiving and transmitting hardware device (which has a receiving and transmitting hardware device capable of performing two-way communication over a two-way communication link). Such a device may comprise: a cellular or other communication device having a single-line display or a multi-line display or a cellular or other communication device without a multi-line display; a personal communications service (PCS), which may combine voice, data processing, facsimile and/or data communication capabilities; a personal digital assistant (PDA), which may comprise a radio frequency receiver, a pager, Internet/intranet access, a web browser, a notepad, a calendar and/or a global positioning system (GPS) receiver; and a conventional laptop and/or palmtop computer or other device, which has and/or includes a conventional laptop and/or palmtop computer or other device of a radio frequency receiver. The term "terminal" or "terminal device" used herein may be portable, transportable and installed in a vehicle (air, marine and/or land), or may be adapted and/or configured to operate locally, and/or operate at any other location on the earth and/or in the space in a distributed fashion. The term "terminal" or "terminal device" used herein may also be a communication terminal, an Internet access terminal, or a music/video playing terminal, which may be for example a PDA, a mobile Internet device (MID) and/or a mobile phone with the music/video playing function, and may also be a smart television, a set-top box, etc.

A time domain unit (also referred to as a time unit) in the present application may be: an OFDM symbol, an OFDM symbol group (which consists of a plurality of OFDM symbols), a time slot, a time slot group (which consists of a plurality of time slots), a subframe, a subframe group (which consists of a plurality of subframes), a system frame, and a system frame group (which consists of a plurality of system frames); the time domain unit may also be an absolute time unit, e.g., 1 millisecond, 1 second, etc.; and the time unit may also be a combination of multiple granularities, e.g., N1 time slots plus N2 OFDM symbols.

A frequency domain unit (also referred to as a frequency unit) in the present application may be: a subcarrier, a subcarrier group (which consists of a plurality of subcarriers), a resource block (RB) (which may also be referred to as a physical resource block (PRB)), a resource block group (which consists of a plurality of RBs), a bandwidth part (BWP), a bandwidth part group (which consists of a plurality of BWPs), a frequency band/carrier, and a frequency band group/carrier group; the frequency domain unit may also be an absolute frequency domain unit, e.g., 1 Hz, 1 kHz, etc.; and the frequency domain unit may also be a combination of multiple granularities, e.g., M1 PRBs plus M2 subcarriers.

The text and drawings are provided by way of example only to assist the reader in understanding the present disclosure. They are neither intended to nor should be construed to limit the scope of the present disclosure in any way. While certain embodiments and examples have been provided, based on the disclosure herein, it will be apparent to those skilled in the art that changes can be made to the embodiments and examples shown without departing from the scope of the present disclosure.

The technical solutions of the embodiments of this application can be applied to various communication systems, for example: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a $5^{th}$ generation (5G) system or new radio (NR), etc. Furthermore, the technical solutions of the embodiments of this application can be applied to future-oriented communication technologies.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 comprises a gNodeB (Gnb) 101, a Gnb 102 and a Gnb 103. The Gnb 101 communicates with the Gnb 102 and the Gnb 103. The Gnb 101 also communicates with at least one Internet Protocol (IP) network 130, such as the Internet, a private IP network or other data networks.

Depending on the type of the network, other well-known terms such as "base station" or "access point" can be used in place of "gNodeB" or "Gnb." For convenience, the terms "gNodeB" and "Gnb" are used in this patent document to refer to network infrastructure components that provide wireless access for remote terminals. And, depending on the type of the network, other well-known terms such as "mobile station," "user station," "remote terminal," "wireless terminal" or "user apparatus" can be used in place of "user equipment" or "UE." For convenience, the terms "user equipment" and "UE" are used in this patent document to refer to remote wireless devices that wirelessly access the Gnb, no matter whether the UE is a mobile device such as a mobile phone or a smart phone or a fixed device as is commonly assumed such as a desktop computer or a vending machine.

The Gnb 102 provides wireless broadband access to the network 130 for a first plurality of user equipment (UE) within a coverage area 120 of the Gnb 102. The first plurality of UE comprise: a UE 111, which may be located in a small business (SB); a UE 112, which may be located in an enterprise I; a UE 113, which may be located in a WiFi hotspot (HS); a UE 114, which may be located in a first reside (R); a UE 115, which may be located in a second reside (R); UE 116, which may be a mobile device (M), such as a cellular phone, a wireless laptop computer, a wireless PDA, ETC. The gNB 103 provides wireless broadband access to the network 130 for a second plurality of UE within a coverage area 125 Of the gNB 103. The second plurality of UE comprise a UE 115 and a UE 116. In some embodiments, one or more of the gNBs 101-103 can communicate with each other and with the UE 111-116 using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more Of the gNB 101, the gNB 102 and the gNB 103 comprise a 2D antenna array as described in embodiments of the present disclosure. In some embodiments, one or more Of the gNB 101, the gNB 102 and the gNB 103 support codebook design and structure for systems with 2D antenna arrays.

Although FIG. 1 illustrates one example of the wireless network 100, various changes can be made to FIG. 1. The wireless network 100 can comprise any number of gNBs and any number of UE in any suitable arrangement, for example. Furthermore, the gNB 101 can directly communicate with any number of UE and provide wireless broadband access to the network 130 for those UE. Similarly, each gNB 102-103 can directly communicate with the network 130 and provide direct wireless broadband access to the network 130 for the UE. In addition, the gNBs 101, 102 and/or 103 can provide access to other or additional external networks, such as external telephone networks or other types of data networks.

Figure 2A:
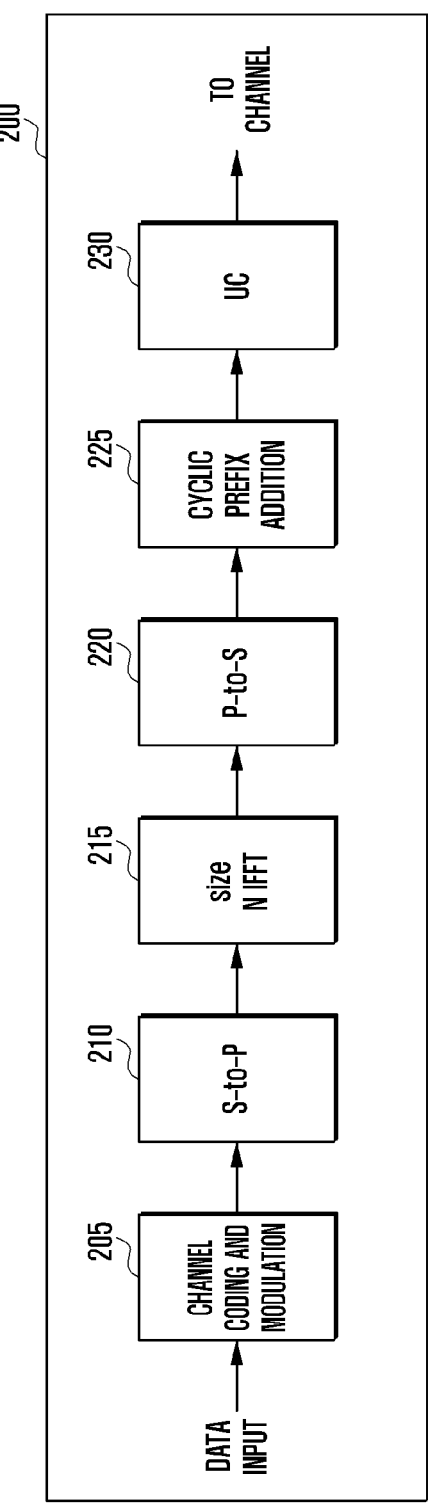
FIG. 2A illustrates example wireless transmission and reception paths according to various embodiments of the present disclosure.
Figure 2B:
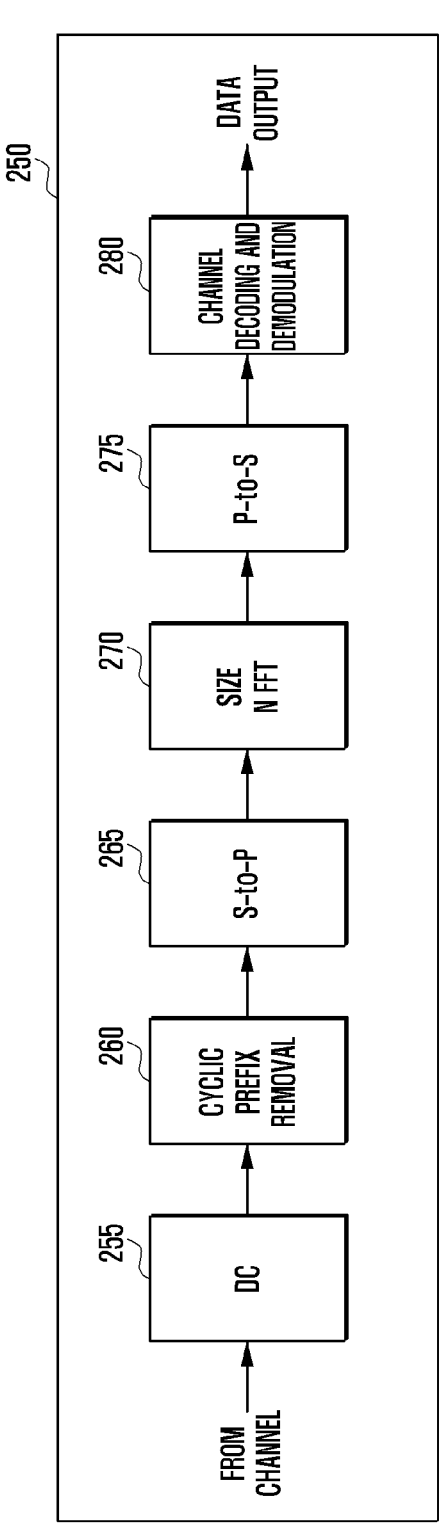
FIG. 2B illustrates example wireless transmission and reception paths according to various embodiments of the present disclosure.

FIGS. 2A and 2B illustrate example wireless transmission and reception paths according to the present disclosure. In the following description, the transmission path 200 can be described as being implemented in a gNB such As the gNB 102, and the reception path 250 can be described as being implemented in UE such as the UE 116. However, it should be understood that the reception path 250 can be implemented in a gNB and the transmission path 200 can be implemented in UE. In some embodiments, the reception path 250 is configured to support codebook design and structure for a system with a 2D antenna array as described in embodiments of the present disclosure.

The transmission path 200 comprises a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 comprises a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding such as low-density parity-check (LDPC) coding, and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, wherein N is a size of the IFFT/FFT used In the gNB 102 and the UE 116. The size N IFFT block 215 performs IFFT operations on the N parallel symbol streams to generate a time-domain output signal. The parallel-to-serial block 220 converts (such as multiplexes) parallel time-domain output symbols from the size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before being converted to the RF frequency.

The RF signal transmitted from the gNB 102 arrives at the UE 116 after passing through the wireless channel, and operations in reverse to those At the gNB 102 are performed at the UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signals into a sequence of modulated data symbols. The channel decoding and demodulation block 280 demodulates and decodes the modulated symbols to recover the original input data stream.

Each of the gNBs 101-103 may implement a transmission path 200 similar to that for transmitting to the UE 111-116 in the downlink, and may implement a reception path 250 similar to that for receiving from the UE 111-116 in the uplink. Similarly, each of the UE 111-116 may implement a transmission path 200 for transmitting to the gNBs 101-103 in the uplink, and may implement a reception path 250 for receiving from the gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and the IFFT block 215 may be implemented as configurable software algorithms, in which the value of the size N may be modified according to the implementation.

Furthermore, although it is described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for the DFT and IDFT functions, the value of the variable N may be any integer (such as 1, 2, 3, 4, etc.), while for the FFT and IFFT functions, the value of the variable N may be any integer which is a power of 2 (such as 1, 2, 4, 8, 16, etc.).

Although FIGS. 2A and 2B illustrate examples of the wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
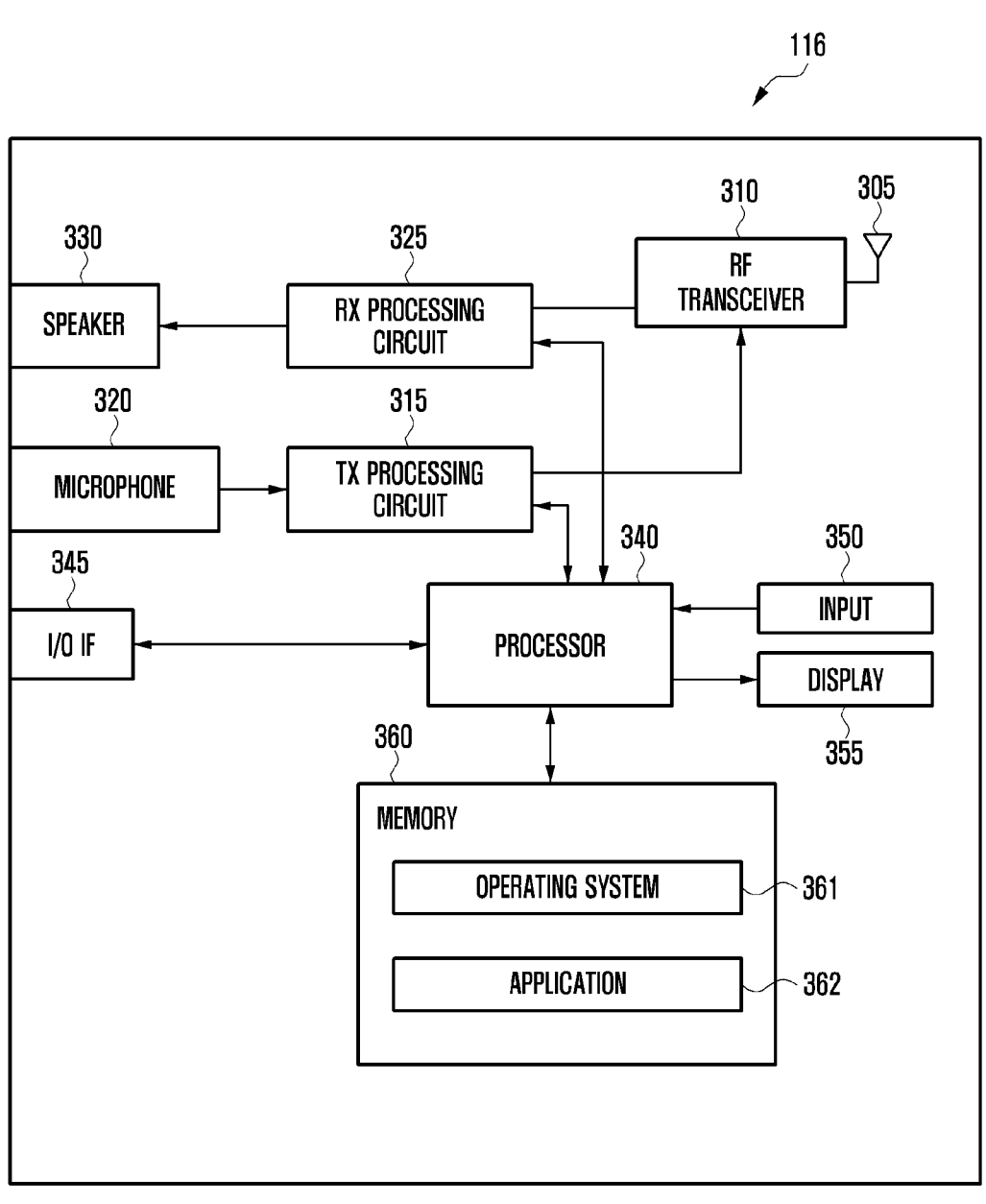
FIG. 3A illustrates example UE 116 according to various embodiments of the present disclosure.

FIG. 3A illustrates example UE 116 according to various embodiments of the present disclosure. The embodiment of the UE 116 shown in FIG. 3A is for illustration only, and the UE 111-115 of FIG. 1 can have the same or similar configuration. However, the UE has various configurations, and FIG. 3A does not limit the scope of the present disclosure to any specific implementation of the UE.

The UE 116 comprises an antenna 305, a radio frequency (RF) transceiver 310, a transmission (TX) processing circuit 315, a microphone 320, and a reception (RX) processing circuit 325. The UE 116 also comprises a speaker 330, a processor/controller 340, an input/output (I/O) interface 345, an input device(s) 350, a display 355, and a memory 360. The memory 360 comprises an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, wherein the RX processing circuit 325 generates a processed baseband signal by filtering, decoding and/or digitizing the baseband or IF signal. The RX processing circuit 325 transmits the processed baseband signal to the speaker 330 (such as for voice data) or to the processor/controller 340 (such as for web browsing data) for further processing.

The TX processing circuit 315 receives analog or digital voice data from the microphone 320 or other outgoing baseband data (such as network data, email or interactive video game data) from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can comprise one or more processors or other processing devices and execute the OS 361 stored in the memory 360 in order to control the overall operation of the UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 comprises at least one microprocessor or microcontroller.

The processor/controller 340 is also capable of executing other processes and programs residing in the memory 360, such as operations for channel quality measurement and reporting for a system with a 2D antenna array as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to the I/O interface 345, wherein the I/O interface 345 provides the UE 116 with the ability to connect to other devices such as laptop computers and handheld computers. The I/O interface 345 is a communication path between these accessories and the processor/controller 340.

The processor/controller 340 is also coupled to the input device(s) 350 and the display 355. An operator of the UE 116 can input data into the UE 116 using the input device(s) 350.

The display 355 may be a liquid crystal display or other displays capable of presenting text and/or at least limited graphics (such as from a website). The memory 360 is coupled to the processor/controller 340. A part of the memory 360 can comprise a random access memory (RAM), while the other part of the memory 360 can comprise a flash memory or other read-only memories (ROMs).

Although FIG. 3A illustrates one example of the UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, the UE can be configured to operate as other types of mobile or fixed devices.

Figure 3B:
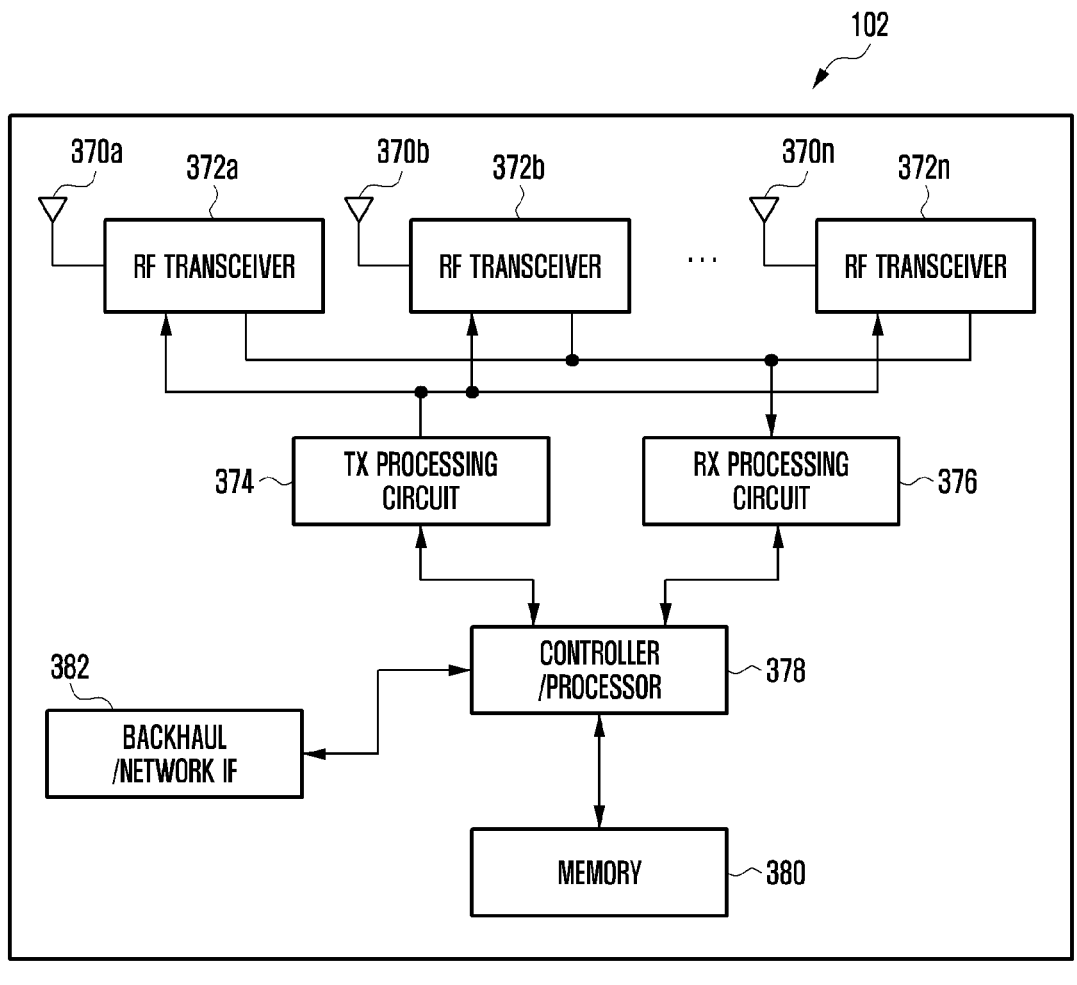
FIG. 3B illustrates an example Gnb 102 according to various embodiments of the present disclosure.

FIG. 3B illustrates an example gNB 102 according to various embodiments of the present disclosure. The embodiment Of the gNB 102 shown in FIG. 3B is for illustration only, and the other gNBs of FIG. 1 can have the same or similar configuration. However, the gNB has various configurations, and FIG. 3B does not limit the scope of the present disclosure to any specific implementation Of the gNB. It should be noted that the gNB 101 and the gNB 103 can comprise the same or similar structure As the gNB 102.

As shown in FIG. 3b, the gNB 102 comprises a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n comprise a 2D antenna array. The gNB 102 also comprises a controller/processor 378, a memory 380, and a backhaul or network interface 382.

The RF transceivers 372a-372n receive an incoming RF signal from the antennas 370a-370n, such as a signal transmitted by UE or other gNBs. The RF transceivers 372a-372n down-convert the incoming RF signal to generate an IF or baseband signal. The IF or baseband signal is transmitted to the RX processing circuit 376, wherein the RX processing circuit 376 generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from the TX processing circuit 374 and up-convert the baseband or IF signal into an RF signal transmitted via the antennas 370a-370n.

The controller/processor 378 can comprise one or more processors or other processing devices that control the overall operation Of the gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. The controller/processor 378 may support any of a variety of other functions In the gNB 102. In some embodiments, the controller/processor 378 comprises at least one microprocessor or microcontroller.

The controller/processor 378 is also capable of executing programs and other processes residing in the memory 380, such as a basic OS. The controller/processor 378 can also support channel quality measurement and reporting for a system with a 2D antenna array as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system such as a cellular communication system supporting 5G or new radio access technology or NR, LTE or LTE-A, the backhaul or network interface 382 can allow the gNB 102 to communicate with other gNBs through wired or wireless backhaul connections. when the gNB 102 is implemented as an access point, the backhaul or network interface 382 can allow the gNB 102 to communicate with a larger network such as the Internet through a wired or wireless local area network or through a wired or wireless connection. The backhaul or network interface 382 comprises any suitable structure that supports communication through a wired or wireless connection, such as Ethernet or an RF transceiver.

The memory 380 is coupled to the controller/processor 378. A part of the memory 380 can comprise an RAM, while the other part of the memory 380 can comprise a flash memory or other ROMs. In certain embodiments, a plurality of instructions such as the BIS algorithm are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths Of the gNB 102 (implemented using the RF transceivers 372a-372n, the TX processing circuit 374 and/or the RX processing circuit 376) support aggregated communication with FDD cells and TDD cells.

Although FIG. 3B illustrates one example Of the gNB 102, various changes may be made to FIG. 3B. For example, the gNB 102 can comprise any number of each component shown in FIG. 3A. As a specific example, the access point can comprise many backhaul or network interfaces 382, and the controller/processor 378 can support routing functions to route data between different network addresses. As another specific example, although shown as comprising a single instance of the TX processing circuit 374 and a single instance of the RX processing circuit 376, the gNB 102 can comprise multiple instances of each (such as one for each RF transceiver).

The transmission in a wireless communication system comprises: a transmission (referred to as a downlink transmission) from a base station (gNB) to user equipment (UE), wherein a corresponding time slot is referred to as a downlink time slot; and a transmission (referred to as an uplink transmission) from the UE to the base station, wherein a corresponding time slot is referred to as an uplink time slot. Meanwhile, there may also be a sidelink (an edge link, e.g., an object-to-object direct connection communication link), and the transmission may be referred to as a sidelink transmission, wherein a corresponding time slot is a sidelink time slot.

In a new radio (NR) communication system, the UE can support two transmission waveform modes during uplink transmission. That is, the UE can use two transmission waveform modes (including OFDM (orthogonal frequency division multiplexing) and DFT-s-OFDM (discrete Fourier transform spread spectrum orthogonal frequency division multiplexing)) for uplink transmission. Generally speaking, the UE determines the transmission waveform mode to be used according to a (semi-static) configuration of the base station. However, since both the location of the UE and the channel condition will be changed during mobile communication, how to better adjust the transmission waveform mode to adapt to the changed channel condition is a problem to be solved.

In the scenario of transmission of a data signal, for example, in the scenario of coverage enhancement, the UE may move from a place closer to a base station of a cell (e.g., with a good channel condition) to a place farther away from the base station of the cell (e.g., with a poor channel condition), and then the UE may no longer be appropriate to transmit the signal using the transmission waveform mode initially configured for high data throughput; Conversely, the UE may move from a place farther away from the base station of the cell (e.g., with a poor channel condition) to a place closer to the base station of the cell (e.g., with a good channel condition), and then the UE may no longer be appropriate to transmit the signal using the waveform mode initially configured for relatively low data throughput but facilitating long-range communication. A method and device for enhancing uplink signal transmission provided by the present disclosure enable the UE to adjust the waveform mode for signal transmission more adaptively by the method provided by the present disclosure.

The means provided by the present disclosure can not only be used for the exemplary uplink transmission scenario, but can also be used for transmission of uplink data signals in other scenarios, e.g., transmission of signals in the sidelink, transmission of signals in a satellite communication link, etc. For illustrative purposes, the method will be exemplarily described hereinafter with reference to transmission of an uplink data signal in uplink transmission, but those skilled in the art will appreciate that the method can also be used for transmission of other signals in other scenarios without departing from the scope of the present disclosure. It shall be understood that in the present disclosure, the terms "uplink transmission," "signal transmission," and "uplink signal transmission" may be used interchangeably with "uplink transmitting," "signal transmitting," and "uplink signal transmitting." It shall also be understood that in the present disclosure, the term "apply" may be used interchangeably with "use."

In the process of communication, the UE can determine the waveform mode for uplink signal transmission through one (can replace with each other) and/or a combination of the following ways.

In one embodiment, the UE determines the waveform mode to be used according to a first way; the first way may be one or a combination of the following example ways.

In one example, the waveform mode to be used is determined based on a measurement result of a DL signal. For example, in one embodiment, the UE can determine the waveform mode to be used based on a reference signal received power (RSRP) of the DL signal. For example, in one embodiment, the UE can compare the RSRP of the DL signal with a first threshold value, and determine the waveform mode to be used according to the comparison result.

In such examples, the DL signal may be at least one of:
(1) a synchronization signal block (SSB), which may in particular be a cell defining SSB (CD-SSB) and/or a non-cell defining SSB (NCD-SSB),
(2) a channel state information-reference signal (CSI-RS),
(3) a demodulation reference signal (DMRS) in a physical downlink control channel (PDCCH) (and/or a physical downlink shared channel (PDSCH)),
(4) a phase tracking reference signal (PTRS), or
(5) a reference signal for positioning (positioning reference signal, PRS), etc.; Those skilled in the art will appreciate that the above DL signals are merely examples and that other DL signals may also be used without departing from the scope of the present disclosure.
In such examples,
The RSRP may be at least one of:
(1) a single measurement, e.g., an instant value, e.g., a measurement of the RSRP of a DL signal (taking an SSB as an example) and/or an average or maximum of the RSRPs of multiple SSBs, wherein the single measurement includes but is not limited to a single measurement of a single DL signal, single measurements of multiple DL signals, and an average or maximum of single measurements of multiple DL signals;
(2) an average or maximum of the RSRPs of one or more DL signals over a period of time, e.g., an average or maximum of multiple measurements of a single DL signal over a period of time, and e.g., an average or maximum of multiple measurements of multiple DL signals over a period of time; or
(3) a change of the RSRP of the SSB, e.g., a change of an average or maximum of the RSRPs of one or more SSBs over a period of time; in one embodiment, the change of the RSRP may be a change relative to a first reference value which may include but is not limited to at least one of the following values that are stored, previous or latest, one-time or over a period of time: a single measurement of a single DL signal, an average or maximum of multiple measurements of a single DL signal over a period of time, an average or maximum of multiple measurements of a single DL signal over another period of time, single measurements of multiple DL signals, an average or maximum of single measurements of multiple DL signals, an average or maximum of multiple measurements of multiple DL signals over a period of time, and an average or maximum of multiple measurements of multiple DL signals over another period of time.
In such examples, the period of time may be a time length configured by the base station, and/or a time length determined by the UE according to a time length occupied by the number of the SSBs needing to be measured.
In such examples, the number and/or index of the multiple SSBs may be a set configured by the base station, or determined by the UE in a set of SSBs having a RSRP greater than or not less than a second threshold value, for example, the multiple SSBs may be the first N or all SSBs of which the RSRPs are greater than or equal to (or not less than) the second threshold value ordered according to for example the strength, wherein N may be a positive integer greater than or equal to 1.

In such examples, the SSBs may be replaced with other DL signals and/or a combination of DL signals.

In such examples, the RSRP may be replaced with the reference signal received quality (RSRQ), the received signal strength indication (RSSI) or the like.

In such examples, The first threshold value may be at least one of following examples.

In one example, a separately configured threshold value, e.g., when a measurement (e.g., an average and/or maximum) of the RSRP of the SSB is used, the threshold value may be a configured threshold value of the RSRP of the SSB which is used for determination of the waveform mode; as another example, when the change of the RSRP of the SSB is used, the threshold value may be a configured threshold value of the change of the RSRP of the SSB which is used for determination of the waveform mode; in one embodiment, the threshold value may be increase Thresh and/or decrease Thresh, which can be used for comparison with the above RSRP, e.g., the threshold can be used for comparison with the change of the RSRP for determination of the waveform mode.

In one example, a reused old threshold value, which may be an SSB-RSRP threshold value configured by the base station and used for msg3 repetition, or an SSB-RSRP threshold value and/or an SSB-RSRP change threshold value of random access-small data transmission (RA-SDT), an SSB-RSRP threshold value and/or an SSB-RSRP change threshold value of configured grant-small data transmission (CG-SDT) and the like, and may also be a threshold value used for selecting an SSB during use of random access; in another embodiment, the old threshold value may also be a threshold value used for determining beam failure in the existing beam failure detection (BFD) and/or beam failure recovery (BFR) procedure.

In one example, the SSBs may be replaced with other DL signals and/or a combination of DL signals.

In one instance, the waveform mode may be OFDM and/or DFT-s-OFDM, or other new waveform modes; preferably, the waveform mode may be expressed as whether transform precoding is enabled, e.g., OFDM may correspond to transform precoding disabled; DFT-s-OFDM may correspond to transform precoding enabled; for the sake of simplicity, in the present disclosure, the method of the present disclosure is described by taking the example that the first waveform mode is OFDM and the second waveform mode is DFT-s-OFDM; those skilled in the art will appreciate that in one embodiment, OFDM may also be referred to as the second waveform mode and DFT-s-OFDM as the first waveform mode.

In one embodiment, the first and second waveform modes may also be replaced with other waveform modes without departing from the scope of the present disclosure.

In one example, comparison is made with the first threshold value, and the waveform mode to be used is determined according to the comparison result, i.e., the UE determines the waveform mode to be used when the first condition is satisfied, and the way in which the UE determines the waveform mode to be used may be one or a combination of the following ways of examples.

In one example, the first condition may comprise a combination of one or more of: (1) the measured RSRP is less than or equal to (or not greater than) the first threshold value;

(2) the measured RSRP is greater than or equal to (or not less than) the first threshold value; (3) preferably, the measured change of the RSRP is less than or equal to (or not greater than) the first threshold value; the change of the RSRP may be a positive change (i.e., become larger), a negative change (i.e., become smaller), or an absolute value of the change, for example, |the change of the RSRP|, which represents the absolute value of the change of the RSRP; (4) preferably, the measured change of the RSRP is greater than or equal to (or not less than) the first threshold value; (5) preferably, the change of the RSRP is a positive change (i.e., becomes larger), the amount of the positive change is greater than or equal to (or not less than) the first threshold value, and the waveform mode previously (or currently) used by the UE is the first waveform mode; (6) preferably, the change of the RSRP is a positive change (i.e., becomes larger), the amount of the positive change is greater than or equal to (or not less than) the first threshold value, and the waveform mode previously (or currently) used by the UE is the second waveform mode; (7) preferably, the change of the RSRP is a negative change (i.e., becomes smaller), the amount of the negative change is greater than or equal to (or not less than) the first threshold value, and the waveform mode previously (or currently) used by the UE is the first waveform mode; (8) preferably, the change of the RSRP is a negative change (i.e., becomes smaller), the amount of the negative change is greater than or equal to (or not less than) the first threshold value, and the waveform mode previously (or currently) used by the UE is the second waveform mode; or (9) preferably, in the existing beam failure detection (BFD) and/or beam failure recovery (BFR) procedure, the beam failure detection counter is equal to or greater than a threshold value N for waveform change counting.

In one example, when the measured RSRP is less than or equal to (or not greater than) the first threshold value, the UE determines that the waveform mode to be used is the second waveform mode (DFT-s-OFDM), i.e., transform precoding enabled.

In one example, when the measured RSRP is greater than or equal to (or not less than) the first threshold value, the UE determines that the waveform mode to be used is the first waveform mode (OFDM), i.e., transform precoding disabled.

In one example, preferably, when the measured change of the RSRP is less than or equal to (or not greater than) the first threshold value, the UE determines that the waveform mode to be used is not changed; preferably, the change of the RSRP may be a positive change (i.e., become larger), a negative change (i.e., become smaller), or an absolute value of the change, for example, |the change of the RSRP|, which represents the absolute value of the change of the RSRP.

In one example, preferably, when the measured change of the RSRP is greater than or equal to (or not less than) the first threshold value, the UE determines the waveform mode to be used in at least one of the following ways of examples.

In one example, preferably, when the change of the RSRP is a positive change (i.e., becomes larger) and the amount of the positive change is greater than or equal to (or not less than) the first threshold value, and when the waveform mode previously (or currently) used by the UE is the first waveform mode, then the waveform mode of the UE may not be changed (i.e., the UE still uses the first waveform mode); and when the waveform mode previously (or currently) used is the second waveform mode, then the waveform mode of the UE may be changed to the first waveform mode.

In one example, preferably, when the change of the RSRP is a negative change (i.e., becomes smaller) and the amount of the negative change is greater than or equal to (or not less than) the first threshold value, when the waveform mode previously (or currently) used by the UE is the first waveform mode, then the waveform mode of the UE may be changed to the second waveform mode; and when the waveform mode previously (or currently) used by the UE is the second waveform mode, then the waveform mode of the UE may not be changed (i.e., the UE still uses the second waveform mode).

In one example, when the first condition is satisfied, the UE can (autonomously) determine the waveform mode to be used and/or determine the waveform mode being used needs to be changed in the above way, and preferably the UE can also transmit a waveform mode confirmation request and/or a waveform mode change request to the base station; preferably, the waveform mode confirmation request is a request for notifying the base station of the waveform mode need to be used which is determined by the UE; preferably, the waveform mode change request is a request for notifying the base station that the UE determines that it is necessary to change the waveform mode previously (or currently) used, and if the UE determines that it is not necessary to change the waveform mode used (i.e., the UE determines to use the same waveform mode as that previously (or currently) used), then the UE may not transmit the waveform mode change request; preferably, the waveform mode confirmation request and/or the waveform mode change request may be transmitted by the UE via a physical random access channel (PRACH) implemented by a PRACH resource (i.e., a specific PRACH time-frequency occasion (RO) and/or a PRACH preamble resource); and/or the waveform mode confirmation request and/or the waveform mode change request can be transmitted by the UE via a specific physical uplink control channel (PUCCH) signal, and/or can be transmitted by the UE via a specific medium access control control element (MAC CE) format.

In one example, preferably, satisfying the first condition may be: satisfying the first condition once, satisfying the first condition for M times, or consecutively satisfying the first condition for M times; for example, satisfying the first condition may be that the waveform change counter (e.g., the transform precoding change counter TP_CHANGE_COUNTER) is greater than and/or equal to M; wherein M may be a (fixed) threshold value pre-configured by the UE or a threshold value configured by the base station received by the UE from the base station, for example, a maximum TP_CHANGE_Max of the transform precoding change counter; determining the waveform mode to be used by satisfying the first condition for M times or consecutively satisfying the first condition for M times can, to a certain extent, reduce the influence caused by false detection, reduce the false alarm probability and reduce the ping-pong effect (i.e., reduce the probability that the UE needs to change the waveform mode back and forth frequently).

In one example, when the second condition is satisfied, the UE acquires a change (adaptation) indication transmitted by the base station to the UE to determine the waveform mode needs to be used.

In such example, the second condition may be one or a combination of the following conditions: (1) the UE reports the value or change of the RSRP of the DL signal as described above; and the base station compares the measured value or change of the RSRP with the first threshold value and according to this comparison; (2) the UE transmits a (specific) sounding reference signal (SRS), which is an SRS configured by the base station for waveform change detection, and the base station measures the SRS and according to comparison of the measured value or change of the RSRP of the SRS with a third threshold value; (3) the base station receives the waveform mode confirmation request and/or the waveform mode change request transmitted by the UE; or (4) the base station determines that the waveform mode to be used by the UE is different from the waveform mode previously (or currently) used by the UE.

In one example, the UE reports the value or change of the RSRP of the DL signal as described above; the base station determines the waveform mode to be used by the UE and/or needs to change the waveform mode used by the UE according to the measured value or change of the RSRP.

In one example, the UE transmits a (specific) SRS, which is an SRS configured by the base station for waveform change detection, and the base station measures a value or change of the RSRP of the SRS to determine the waveform mode to be used by the UE and/or needs to change the waveform mode used by the UE.

In one example, the base station determines the waveform mode to be used by the UE and/or needs to change the waveform mode used by the UE according to the waveform mode confirmation request and/or the waveform mode change request transmitted by the UE.

In one example, preferably, when the second condition is satisfied, the UE receives a waveform mode indication and/or a waveform mode change indication transmitted by the base station, and in one embodiment, the waveform mode indication and/or the waveform mode change indication may be received through a PDCCH (e.g., in the DCI for scheduling uplink data together with the UL grant; and/or in the DCI for activating the CG-PUSCH, and/or in a specific DCI format) and/or received through a downlink MAC CE; preferably, the DCI format may be UE group common, for example, obtained through PDCCH search scrambled by TP_CHANGE_RNTI (RNTI, Radio Network Temporary Identifier), wherein TP_CHANGE_RNTI is obtained by the UE through the configuration of the base station; different UE may obtain the same TP_CHANGE_RNTI configuration.

In one example, preferably, after the UE correctly receives the waveform mode indication of the base station, the UE needs to perform feedback (e.g., positive feedback, ACK) through an uplink signal, wherein the uplink signal may be a PUCCH resource configured by the base station and/or an uplink MAC CE.

In one example, when the UE determines the waveform mode for uplink transmission and/or determines to change the waveform mode for uplink transmission and/or receives an indication from the base station to determine the waveform mode for uplink transmission and/or receives an indication from the base station to determine to change the waveform mode for uplink transmission, the UE can take a first operation (a combination of one or more of the following operations).

In one example, when the UE determines the waveform mode for uplink transmission and/or determines to change the waveform mode for uplink transmission, the UE can apply the determined waveform mode after determining the waveform mode In one example, the UE can directly apply the determined waveform mode after determining the waveform mode; preferably, if the determined waveform mode is different from the waveform mode previously (or currently) used, the UE directly uses the determined waveform mode in the subsequent uplink signal transmission.

In one example, preferably, an indication of the waveform mode used is carried in the uplink signal so as to enable the base station to learn the waveform mode currently used by the UE, and the indication may use one or a combination of the following ways.

In one example, an indication is implemented by transmitting a UL control information (UCI) part on the PUSCH, i.e., separately configuring a UCI bit to indicate the used waveform mode and/or to indicate whether the used waveform mode is changed; for example, 1-bit UCI is used, wherein "1" represents the first waveform mode; "0" represents the second waveform mode; or, "1" represents that the waveform mode is changed (e.g., the waveform mode used before is the first waveform mode, and is changed from now on to the second waveform mode for use in uplink data transmission); "0" represents that the waveform mode is not changed (e.g., the waveform mode used before is the first waveform mode, which is still used for the current or subsequent uplink data transmission).

In one example, the used waveform mode and/or whether the waveform mode is changed is indicated through different transmission configurations on the PUSCH, wherein the transmission configurations comprise a DMRS pattern, and/or a DMRS resource (comprising a DMRS sequence id and/or a DMRS port), and/or an MCS index, and/or a TBS indication; taking that the transmission configuration is a DMRS resource as an example, when the first waveform mode is used or when the waveform mode is changed, the UE uses a DMRS resource 1; when the second waveform mode is used or when the waveform mode is not changed, the UE uses a DMRS resource 2; preferably, the UE can obtain a corresponding relationship between different transmission configurations and the waveform mode indication through configuration information of the base station; if the base station receives and detects the DMRS resource 1, then it represents that the waveform mode used in the transmission or the transmission subsequent thereto is the first waveform mode or a different one from the previous waveform mode.

In one example, preferably, if the determined waveform mode is different from the waveform mode previously (or currently) used, then the UE needs to report a waveform mode change, for example, transmit a waveform mode confirmation request and/or a waveform mode change request.

In one example, preferably, after the UE reports the waveform mode change, an acknowledgement of the base station needs to be obtained before the waveform mode is changed, wherein the acknowledgement may be included in, for example, the waveform mode indication and/or the waveform mode change indication.

In one example, preferably, the UE applies the confirmed waveform mode or the changed waveform mode after a time N+delta1, wherein N is a time unit where a PDCCH, PDSCH, in which the acknowledgement received from the base station is located, is located, and/or a start point of the time unit and/or an end point of the time unit; delta1 is a time interval (e.g., used for processing the waveform change, and/or receiving and decoding the PDCCH, PDSCH), which may be a fixed value (e.g., a capability value reported by the UE) and/or a value configured by the base station and received from the base station.

In one example, preferably, when the UE determines the waveform mode and/or to change the waveform mode by receiving the indication of the base station, the UE may apply the confirmed waveform mode or the changed waveform mode after a time N+delta2.

In one example, preferably, if the determined waveform mode is different from the waveform mode previously (or currently) used, then the UE needs to apply the confirmed waveform mode or the changed waveform mode after the time N+delta2.

In one example, N may be a time unit where a PDCCH, PDSCH, in which the waveform indication received from the base station is located, is located, and/or a start point of the time unit and/or an end point of the time unit.

In one example, Delta2 is a time interval (e.g., used for processing the waveform change, and/or receiving and decoding the PDCCH, PDSCH), which may be a fixed value (e.g., a capability value reported by the UE) and/or a value configured by the base station and received from the base station.

In one example, preferably, the UE performs a second operation when the waveform mode is determined and a third condition is satisfied.

In one example, the third condition may be one or a combination of the following conditions: (1) the UE performs four-step random access, and in particular, performs message three (msg3) transmission in the four-step random access; (2) the UE performs two-step random access, and in particular, performs msgA PUSCH transmission in the two-step random access; (3) the UE performs small data transmission (SDT), and preferably, performs configured grant (CG) SDT PUSCH (including any PUSCH repetition) transmission, and/or performs message three transmission in the four-step RA-SDT, and/or performs message A PUSCH transmission in the two-step RA-SDT, and/or performs subsequent transmission of the PUSCH scheduled by the base station through DCI UL GRANT in the CG-SDT/RA-SDT process; (4) in an ongoing hybrid automatic repeat request (HARD) process; (5) in transmission of an ongoing transport block over multiple slots (TBoMS), and specifically, in transmission of one PUSCH repetition and/or all PUSCH repetitions in an ongoing TBoMS; (6) in a time domain window to which joint channel estimation and/or DMRS bundle is applied; (7) when an inter-slot or intra-slot frequency hopping operation is activated in transmission of a PUSCH; and/or (8) performing transmission of a phase tracking reference signal (PTRS), preferably in a time unit or period in which the PTRS is transmitted.

In one example, the second operation may be one or a combination of the following operations: (1) the determined waveform mode is applied after the delay time W, and preferably, the delay time W may be configured by the base station or may be a predetermined fixed value; preferably, the delay time W can be confirmed according to the third condition, wherein, for example, the delay time W may be the time to the end of a random access procedure (comprising 2-step random access and/or 4-step random access), and/or the time to the end of an SDT procedure (comprising the CG-SDT and/or RA-SDT process), and/or the time to the end of an HARQ process; and/or the time to the end of transmission of a TBoMS; and/or the time to the end of a time domain window; those skilled in the art will appreciate that the above delay time W is merely an example and that any other delay time W may be used without departing from the scope of the present disclosure; (2) not applying the determined waveform mode; (3) ignoring the waveform mode indication and/or the waveform mode change indication of the base station; (4) stopping the current signal transmission; and/or (5) Resuming signal transmission using the determined waveform mode; the signal transmission may be PUSCH (and/or DMRS) signal transmission, and may also be other uplink signal transmission such as the PTRS; preferably, the signal transmission is resumed using the determined waveform mode after the time N+delta1 or N+delta2.

The UE performs uplink signal transmission according to the determined waveform mode.

Figure 4:
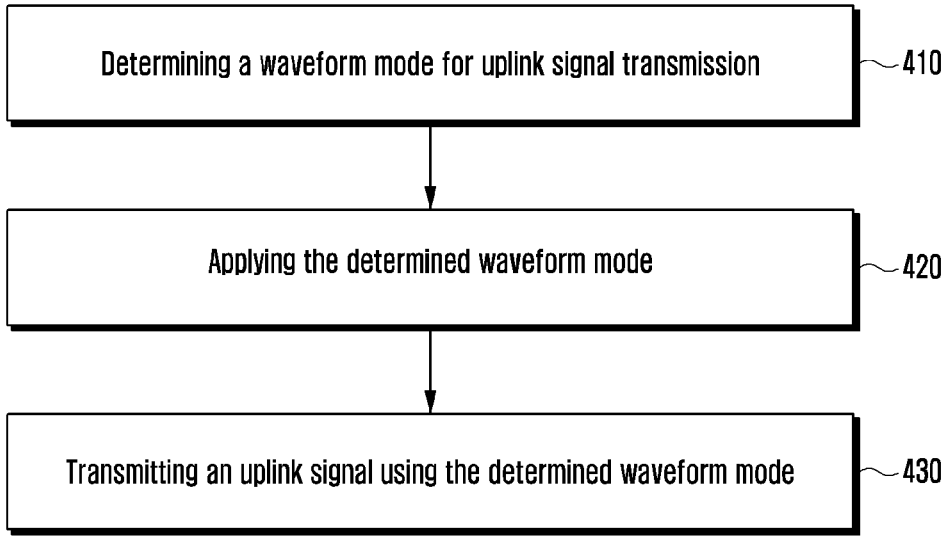
FIG. 4 illustrates an example flow chart of a method for enhancing uplink signal transmission according to various embodiments of the present disclosure.

FIG. 4 illustrates an example flow chart of a method for enhancing uplink signal transmission according to various embodiments of the present disclosure.

In step 410, the UE determines a waveform mode for uplink signal transmission.

In one embodiment, the UE determines the waveform mode for uplink signal transmission may comprise the UE determining the waveform mode according to the measurement of a DL signal, and/or receiving a waveform mode indication and/or a waveform mode change indication from a base station and determining the waveform mode according to the indication. For example, in one embodiment, the UE can determine the waveform mode based on an RSRP of the DL signal. For example, in one embodiment, the UE can compare the RSRP of the DL signal with a first threshold value, and determine the waveform mode according to the comparison result.

The meanings of the DL signal, the RSRP and the first threshold value are as described above and will not be described in detail here.

In one embodiment, comparing the RSRP of the DL signal with the first threshold value and determining the waveform mode according to the comparison result may comprise: determining the waveform mode when a first condition is satisfied. Here, the first condition is as described above, and will not be described again here.

Determining the waveform mode when a first condition is satisfied comprises a combination of one or more of:

(1) determining to use a second waveform mode when the measured RSRP is less than or equal to the first threshold value;

(2) determining to use a first waveform mode when the measured RSRP is greater than or equal to the first threshold value;

(3) determining not to change the previously or currently used waveform mode when the measured change of the RSRP is less than or equal to the first threshold value;

(4) determining to continue using the first waveform mode when the measured change of the RSRP is a positive change which has an amount greater than or equal to the first threshold value and the waveform mode previously or currently used by the UE is the first waveform mode;

(5) determining to change to the first waveform mode when the measured change of the RSRP is a positive change which has an amount greater than or equal to the first threshold value and the waveform mode previously or currently used by the UE is the second waveform mode;

(6) determining to change to the second waveform mode when the measured change of the RSRP is a negative change which has an amount greater than or equal to the first threshold value and the waveform mode previously or currently used by the UE is the first waveform mode; and/or (7) determining to continue using the second waveform mode when the measured change of the RSRP is a negative change which has an amount greater than or equal to the first threshold value and the waveform mode previously or currently used by the UE is the second waveform mode.

In one embodiment, satisfying the first condition comprises satisfying the first condition once, satisfying the first condition for a certain number of times, or consecutively satisfying the first condition for a certain number of times. In one embodiment, the certain number of times may be M times, with M being a natural number.

In one embodiment, the method may further comprise transmitting a waveform mode confirmation request and/or a waveform mode change request to the base station by the UE after the UE determines the waveform mode to be used.

In one embodiment, a waveform mode indication and/or a waveform mode change indication transmitted by the base station may be an acknowledgement of the waveform mode confirmation request and/or the waveform mode change request.

In one embodiment, the waveform mode indication and/or the waveform mode change indication is received from the base station when a second condition is satisfied, wherein the second condition comprises a combination of one or more of:

(1) the UE reports the value or change of the RSRP of the DL signal;

(2) the UE transmits a sounding reference signal (SRS);

(3) the UE transmits a waveform mode confirmation request and/or a waveform mode change request; and/or (4) the waveform mode determined by the base station is different from the waveform mode previously or currently used by the UE.

Optionally, in step 420, the UE applies the determined waveform mode.

In one embodiment, applying the determined waveform mode by the UE may comprise: determining the time for applying the determined waveform mode according to the time when the waveform mode indication and/or the waveform mode change indication is received from the base station.

In one embodiment, determining the time for applying the determined waveform mode according to the time when the waveform mode indication and/or the waveform mode change indication is received from the base station may comprise: determining a first time for applying the determined waveform mode according to a time unit where an acknowledgement of the waveform mode confirmation request and/or the waveform mode change request received from the base station is located and a first time interval; and/or determining a second time for applying the determined waveform mode according to a time unit where the waveform mode indication and/or the waveform mode change indication received from the base station is located and a second time interval. For example, the first time may be after the above N+delta1 in the case of the acknowledgement of the waveform mode confirmation request and/or the waveform mode change request is received from the base station. As another example, the second time may be after the above N+delta2 in the case of receiving the waveform mode indication and/or the waveform mode change indication from the base station directly without a request.

In step 430, the UE transmits an uplink signal using the determined waveform mode.

In one embodiment, when the waveform mode is determined and a third condition is satisfied, the UE can perform a second operation, wherein the third condition and the second operation are as described above and will not be described in detail herein.

In one embodiment, the waveform mode comprises at least one of the first waveform mode represented as transform precoding disabled and the second waveform mode represented as transform precoding enabled.

Figure 5:
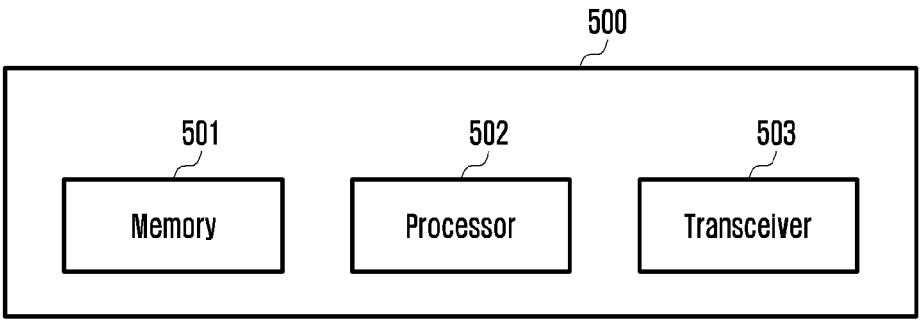
FIG. 5 illustrates a block diagram of user equipment according to various embodiments of the present disclosure.

FIG. 5 illustrates a block diagram of user equipment 500 according to various embodiments of the present disclosure. The user equipment comprises a memory 501 and a processor 502. The memory has stored thereon computer-executable instructions that, when executed by the processor, perform at least one method according to the above embodiments of the present disclosure. The transceiver 503 may receive an incoming RF signal transmitted by a base station of the wireless network.

In particular, for example, the processor may be configured to determine a waveform mode for uplink signal transmission; and transmit an uplink signal using the determined waveform mode.

Figure 6:
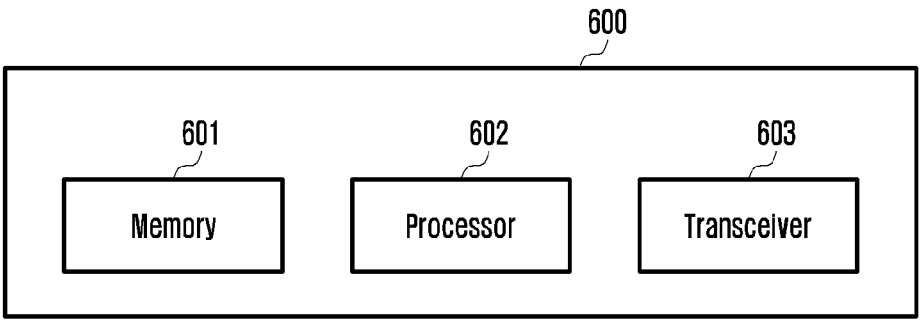
FIG. 6 illustrates a block diagram of a base station according to various embodiments of the present disclosure.

FIG. 6 illustrates a block diagram of a base station 600 according to various embodiments of the present disclosure. The base station comprises a memory 601 and a processor 602. The memory has stored thereon computer-executable instructions that, when executed by the processor, perform at least one method according to the above embodiments of the present disclosure. The RF transceiver 603 may receive an incoming RF signal transmitted by a UE the wireless network.

Specifically, for example, the processor may be configured to transmit to user equipment (UE) a waveform mode indication and/or a waveform mode change indication for uplink signal transmission when a second condition is satisfied, wherein the second condition comprises a combination of one or more of: the value or change of a reference signal received power (RSRP) of a downlink (DL) signal is received from the UE; a sounding reference signal (SRS) is received from the UE; a waveform mode confirmation request and/or a waveform mode change request is received from the UE; and the waveform mode determined by the base station is different from the waveform mode previously or currently used by the UE.

The present disclosure also provides a computer-readable medium having stored thereon computer-executable instructions that, when executed, cause a processor to perform any of the methods described in the embodiments of the present disclosure.

In particular, for example, the processor may be configured to determine a waveform mode for uplink signal transmission; and transmit an uplink signal using the determined waveform mode. As another example, the processor may be configured to transmit to user equipment (UE) a waveform mode indication and/or a waveform mode change indication for uplink signal transmission when a second condition is satisfied, wherein the second condition comprises a combination of one or more of: the value or change of a reference signal received power (RSRP) of a downlink

25

(DL) signal is received from the UE; a sounding reference signal (SRS) is received from the UE; a waveform mode confirmation request and/or a waveform mode change request is received from the UE; and the waveform mode determined by the processor is different from the waveform mode previously or currently used by the UE.

The "user equipment" or "UE" herein may refer to any terminal having wireless communication capabilities, including but not limited to a mobile phone, a cellular phone, a smart phone or a personal digital assistant (PDA), a portable computer, an image capture device such as a digital camera, a gaming device, a music storage and playback device, and any portable unit or terminal having wireless communication capabilities, or an Internet appliance allowing wireless Internet access and browsing and the like.

The term "base station" (BS) or "network device" used herein may refer to an eNB, an eNodeB, a nodeB, or a base transceiver station (BTS) or a gNB and the like depending on the technology and terms used.

The "memory" herein may be of any type suitable for the technical environment herein and may be implemented using any suitable data storage technology, including but not limited to semiconductor-based memory devices, magnetic memory devices and systems, optical memory devices and systems, fixed memories, and removable memories.

The processor herein may be of any type suitable for the technical environment herein, including but not limited to one or more of the following: a general purpose computer, a special purpose computer, a microprocessor, a digital signal processor (DSP), and a processor based on a multi-core processor architecture.

What described above is merely the preferred embodiments of the present disclosure, but is not intended to limit the present disclosure, and any modification, equivalent replacement, improvement and so on made within the spirit and principle of the present disclosure are all covered within the scope as claimed by the present disclosure.

As can be understood by those skilled in the art, the present disclosure includes devices for performing one or more of the operations described in the present application. These devices may be specially designed and manufactured for the required purposes, or may also include known devices in general-purpose computers. These devices have computer programs stored therein, which are selectively activated or reconfigured. Such computer programs may be stored in a device (e.g., computer) readable medium or any type of medium suitable for storing electronic instructions and respectively coupled to a bus, and the computer readable medium includes but is not limited to any type of disk (including a floppy disk, a hard disk, an optical disk, a CD-ROM, and a magneto-optical disk), a read-only memory (ROM), a random access memory (RAM), an erasable programmable read-only memory (EPROM), an electrically erasable programmable read-only memory (EEPROM), a flash memory, a magnetic card or an optical card. That is, the readable medium includes any medium allowing a device (e.g., a computer) to store or transmit information in a readable form.

As can be understood by those skilled in the art, each and a combination of blocks in the structure diagrams and/or block diagrams and/or flow charts can be implemented by computer program instructions. As can be understood by those skilled in the art, the computer program instructions may be implemented by a general purpose computer, a special purpose computer, or a processor for other programmable data processing methods so that the schemes specified in one or more of the blocks in the structure diagrams and/or block diagrams and/or flow charts disclosed in the present disclosure are executed by the computer or the processor of other programmable data processing methods.

As can be recognized by those skilled in the art, the present disclosure may be implemented in other specific forms without changing the technical idea or essential characteristics thereof. Accordingly, it shall be understood that the above embodiments are illustrative only and not restrictive. The scope of the present disclosure is defined by the appended claims, rather than the detailed description. Therefore, it shall be understood that all modifications or changes coming within the meaning and scope of the appended claims and their equivalents are within the scope of the present disclosure.

In the above embodiments of the present disclosure, all operations and steps may be selectively performed or may be omitted. Furthermore, the operations and steps in each embodiment need not be performed sequentially, and the order of the operations and steps may vary.

While the present disclosure has been shown and described with reference to the various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by user equipment (UE) in a communication system, the method comprising:

receiving, from a base station, downlink control information (DCI), wherein the DCI includes an uplink grant and an indicator indicating whether a transform precoding is enabled or disabled for a first uplink transmission;

determining, based on the indicator, whether the transform precoding is enabled or disabled for the first uplink transmission;

transmitting, to the base station, the first uplink transmission based on a first waveform in case that the indicator indicates that the transform precoding is disabled for the first uplink transmission; and transmitting, to the base station, the first uplink transmission based on a second waveform in case that the indicator indicates that the transform precoding is enabled for the first uplink transmission, wherein the first waveform corresponds to orthogonal frequency division multiplexing (OFDM) and a second waveform corresponds to discrete Fourier transform-spread-OFDM (DFT-s-OFDM).

2. The method of claim 1, further comprising:

receiving, from the base station, downlink reference signals;

obtaining a change of reference signal received power (RSRP) based on the downlink reference signals;

determining, based on the change of the RSRP, a waveform for a second uplink transmission from the first waveform and the second waveform; and transmitting, to the base station, the second uplink transmission based on the waveform for the second uplink transmission, wherein determining the waveform for the second uplink transmission comprises:

determining to use the first waveform for the second uplink transmission in case that the change of the RSRP corresponds to a positive value and an amount of the change of the RSRP is greater than or equal to a threshold; and determining to use the second waveform for the second uplink transmission in case that the change of the RSRP corresponds to a negative value and the amount of the change of the RSRP is greater than or equal to the threshold, and wherein the threshold is configured by the base station.

3. The method of claim 2, wherein determining the waveform for the second uplink transmission further comprises:

determining to use a previously used waveform from the first waveform and the second waveform for the second uplink transmission in case that the amount of change of the RSRP is less than the threshold, and wherein, in case that the amount of the change of the RSRP is greater than or equal to the threshold, the determined waveform is changed from the previously used waveform.

4. The method of claim 1, wherein the DCI includes the indicator in case that at least one first condition is satisfied, and wherein the at least one first condition includes:

the UE reports information on the change of the RSRP;

the UE transmits a sounding reference signal (SRS), the SRS being configured for a waveform change detection; and the UE transmits a waveform confirmation request or a waveform change request.

5. The method of claim 1, wherein the first waveform or the second waveform identified based on the indicator is applied to at least one of a first time or a second time, wherein the first time is determined based on (i) a time unit where at least one of an acknowledgement of a waveform confirmation request or a waveform mode change request received from the base station is located and (ii) a first time interval, and wherein the second time is determined based on (i) a time unit where the DCI is located and (ii) a second time interval.

6. The method of claim 2, wherein at least one operation is performed in case that the waveform for the second uplink transmission is determined and at least one second condition is satisfied, wherein the at least one second condition includes:

the UE performs a four-step random access;

the UE performs a two-step random access;

the UE performs small data transmission;

the UE performs a hybrid automatic repeat request (HARQ) process;

the UE performs transmission of a transport block over multiple slots (TBoMS);

a time domain window is applied wherein the time domain window for at least one of a joint channel estimation or a demodulation reference signal (DMRS) bundle;

an inter-slot or an intra-slot frequency hopping operation is activated for a physical uplink shared channel (PUSCH); and the UE performs a transmission of a phase tracking reference signal, and wherein the at least one operation includes:

applying the determined waveform after a delay time;

determining not to apply the determined waveform mode;

ignoring at least one of a waveform indication or a waveform change indication from the base station;

stopping a current uplink transmission; and resuming an uplink transmission using the determined waveform.

7. The method of claim 2, further comprising:

transmitting, to the base station, an indication of the determined waveform for the second uplink transmission, via an uplink control information (UCI) part, wherein a first downlink signal among downlink signals corresponds to highest strength among N first downlink signals received from the base station, and wherein a second downlink signal among the downlink signals corresponds to highest strength among N second downlink signals received from the base station after a reception of the N first downlink signals.

8. A user equipment (UE) in a communication system, the UE comprising:

a transceiver; and a processor operably coupled with the transceiver and configured to:

receive, from a base station, downlink control information (DCI), wherein the DCI includes an uplink grant and an indicator indicating whether a transform precoding is enabled or disabled for first uplink transmission;

determine, based on the indicator, whether the transform precoding is enabled or disabled for the first uplink transmission;

transmit, to the base station, the first uplink transmission based on a first waveform in case that the indicator indicates that the transform precoding is disabled for first uplink transmission; and transmit, to the base station, the first uplink transmission based on a second waveform in case that the indicator indicates that the transform precoding is enabled for a first uplink transmission, wherein the first waveform corresponds to orthogonal frequency division multiplexing (OFDM) and a second waveform corresponds to discrete Fourier transform-spread-OFDM (DFT-S-OFDM).

9. The UE of claim 8, wherein the processor is further configured to:

receive, from the base station, downlink reference signals;

obtain a change of reference signal received power (RSRP) based on the downlink reference signals;

determine, based on the change of the RSRP, a waveform for a second uplink transmission from the first waveform and the second waveform; and transmit, to the base station, the second uplink transmission based on the waveform for the second uplink transmission, wherein, for determining the waveform for the second uplink transmission, the processor is further configured to:

determine to use the first waveform in case that the change of the RSRP corresponds to a positive value and an amount of the change of the RSRP is greater than or equal to a threshold; and determine to use the second waveform in case that the change of the RSRP corresponds to a negative value and the amount of the change of the RSRP is greater than or equal to the threshold, and wherein the threshold is configured by the base station.

10. The UE of claim 9, wherein, for determining the waveform for the second uplink transmission, the processor is further configured to:

determine to use a previously used waveform from the first waveform and the second waveform for the second uplink transmission in case that the amount of change of the RSRP is less than the threshold, and wherein, in case that the amount of the change of the RSRP is greater than or equal to the threshold, the determined waveform is changed from the previously used waveform.

11. The UE of claim 8, wherein, in case that at least one first condition is satisfied, the DCI includes the indicator, and wherein the at least one first condition includes:

the UE reports information on the change of the RSRP;

the UE transmits a sounding reference signal (SRS), the SRS being configured for a waveform change detection; and the UE transmits a waveform confirmation request or a waveform change request.

12. The UE of claim 8, wherein the first waveform or the second waveform identified based on the indicator is applied to at least one of a first time or a second time, wherein the first time is determined based on (i) a time unit where at least one of an acknowledgement of a waveform confirmation request or a waveform mode change request received from the base station is located and (ii) a first time interval, and wherein the second time is determined based on (i) a time unit where the DCI is located and (ii) a second time interval.

13. The UE of claim 9, wherein at least one operation is performed in case that the waveform for the second uplink transmission is determined and at least one second condition is satisfied, wherein the at least one second condition includes:

the UE performs a four-step random access;

the UE performs a two-step random access;

the UE performs a small data transmission;

the UE performs a hybrid automatic repeat request (HARQ) process;

the UE performs a transmission of a transport block over multiple slots (TBoMS);

a time domain window is applied wherein the time domain window for at least one of a joint channel estimation or a demodulation reference signal (DMRS) bundle;

an inter-slot or an intra-slot frequency hopping operation is activated for a physical uplink shared channel (PUSCH); and the UE performs a transmission of a phase tracking reference signal, and wherein the at least one operation includes:

applying the determined waveform after a delay time;

determining not to apply the determined waveform mode;

ignoring at least one of a waveform indication or a waveform change indication from the base station;

stopping a current uplink transmission; and resuming an uplink transmission using the determined waveform.

14. The UE of claim 9, wherein the processor is further configured to:

transmit, to the base station via an uplink control information (UCI) part, an indication of the determined waveform for the second uplink transmission, and wherein a first downlink signal among downlink signals corresponds to highest strength among N first downlink signals received from the base station, and wherein a second downlink signal among the downlink signals corresponds to highest strength among N second downlink signals received from the base station after a reception of the N first downlink signals.

15. A method performed by a base station in a communication system, the method comprising:

determining whether a transform precoding is enabled or disabled for a first uplink transmission for a user equipment (UE);

transmitting, to the UE, downlink control information (DCI), wherein the DCI includes an uplink grant and an indicator indicating whether the transform precoding is enabled or disabled; and receiving, from the UE, the first uplink transmission, wherein:

the first uplink transmission is based on a first waveform in case that the indicator indicates that the transform precoding is disabled for a first uplink transmission; and the first uplink transmission based on a second waveform in case that the indicator indicates that the transform precoding is enabled for a first uplink transmission, and wherein the first waveform corresponds to orthogonal frequency division multiplexing (OFDM) and a second waveform corresponds to discrete Fourier transform-spread-OFDM (DFT-s-OFDM).

16. The method of claim 15, further comprising:

transmitting, to the UE, downlink reference signals;

transmitting, to the UE, configuration information on a threshold for a of reference signal received power (RSRP) associated with the downlink reference signals; and receiving, from the UE, a second uplink transmission, wherein:

the second uplink transmission is based on the first waveform in case that the change of the RSRP corresponds to a positive value and an amount of the change of the RSRP is greater than or equal to a threshold, the second uplink transmission is based on the second waveform in case that the change of the RSRP corresponds to a negative value and the amount of the change of the RSRP is greater than or equal to the threshold.

17. A base station in a communication system, the base station comprising:

a transceiver; and a processor operably coupled with the transceiver and configured to:

determine whether a transform precoding is enabled or disabled for a first uplink transmission for a user equipment (UE);

transmit, to the UE, downlink control information (DCI), wherein the DCI includes an uplink grant and an indicator indicating whether the transform precoding is enabled or disabled; and receive, from the UE, the first uplink transmission, wherein:

the first uplink transmission is based on a first waveform in case that the indicator indicates that the transform precoding is disabled for a first uplink transmission; and the first uplink transmission is based on a second waveform in case that the indicator indicates that the transform precoding is enabled for the first uplink transmission, wherein the first waveform corresponds to orthogonal frequency division multiplexing (OFDM) and a second waveform corresponds to discrete Fourier transform-spread-OFDM (DFT-s-OFDM).

18. The base station of claim 17, wherein the processor is further configured to:

transmit, to the UE, downlink reference signals;

transmit, to the UE, configuration information on a threshold for a change of reference signal received power (RSRP) associated with the downlink reference signals; and receive, from the UE, a second uplink transmission, wherein:

the second uplink transmission is based on the first waveform in case that the change of the RSRP corresponds to a positive value and an amount of the change of the RSRP is greater than or equal to a threshold, the second uplink transmission is based on the second waveform in case that the change of the RSRP corresponds to a negative value and the amount of the change of the RSRP is greater than or equal to the threshold.

19. The method of claim 1, wherein the first uplink transmission is performed based on the uplink grant.

20. The UE of claim 8, wherein the first uplink transmission is performed based on the uplink grant.

* * * * *